US012615623B2

(12) United States Patent
Hamada

(10) Patent No.: US 12,615,623 B2
(45) Date of Patent: Apr. 28, 2026

(54) WIRELESS COMMUNICATION APPARATUS, WIRELESS NETWORK MANAGEMENT APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 752 days.

(21) Appl. No.: 17/877,027

(22) Filed: Jul. 29, 2022

(65) Prior Publication Data

US 2023/0062906 A1 Mar. 2, 2023

(30) Foreign Application Priority Data

Aug. 24, 2021 (JP) ................................. 2021-136655

(51) Int. Cl.
*H04W 72/04* (2023.01)
*H04W 72/0446* (2023.01)
(52) U.S. Cl.
CPC .............................. *H04W 72/0446* (2013.01)
(58) Field of Classification Search
CPC ..... H04W 76/14; H04W 72/20; H04W 88/04; H04W 88/085; H04W 4/06; H04W 4/40;
(Continued)

(56) References Cited

U.S. PATENT DOCUMENTS 8,761,049 B2 6/2014 Hamada
9,491,791 B2 11/2016 Hamada
(Continued)

FOREIGN PATENT DOCUMENTS

CN 103650557 A 3/2014
CN 104467911 A 3/2015
(Continued)

OTHER PUBLICATIONS

Notice of Reasons for Refusal issued by the Japanese Patent Office on Aug. 15, 2025 in corresponding JP Patent Application No. 2021-136655, with English translation.
(Continued)

*Primary Examiner* — Lan-Huong Truong

(74) *Attorney, Agent, or Firm* — Carter, DeLuca & Farrell LLP

(57) ABSTRACT

There is provided a wireless communication apparatus. The wireless communication apparatus comprises: a first wireless communication unit configured to perform wireless communications with a first base station belonging to a first wireless communication system; a second wireless communication unit configured to perform wireless communications between wireless communication apparatuses not via the first base station; an acquisition unit configured to acquire, via the second wireless communication unit, an operating information message including pattern information indicating a time division transmission/reception pattern between a second base station belonging to a second wireless communication system different from the first wireless communication system and a second wireless communication apparatus belonging to the second wireless communication system; and a notifying unit configured to notify the first base station of the pattern information acquired by the acquisition unit, via the first wireless communication unit.

11 Claims, 13 Drawing Sheets

(58) Field of Classification Search
     CPC ....... H04W 40/22; H04W 84/04; H04W 4/46;
                          H04W 84/047; Y02D 30/70
     See application file for complete search history.

(56)                   References Cited

U.S. PATENT DOCUMENTS

| | | | |
|---|---|---|---|
| 9,974,104 | B2 | 5/2018 | Hamada |
| 2017/0311113 | A1 | 10/2017 | Abraham |
| 2020/0367063 | A1* | 11/2020 | Kato ................. H04W 72/0446 |
| 2021/0227375 | A1 | 7/2021 | Hamada |
| 2021/0250910 | A1* | 8/2021 | Park ..................... H04L 5/0044 |
| 2023/0055885 | A1* | 2/2023 | Abedini ............. H04W 72/542 |

FOREIGN PATENT DOCUMENTS

| | | | |
|---|---|---|---|
| JP | 2015-517779 | A | 6/2015 |
| JP | 2019-208270 | A | 12/2019 |
| JP | 2020-156042 | A | 9/2020 |
| WO | 2014/166060 | A1 | 10/2014 |
| WO | 2020/196483 | A1 | 10/2020 |
| WO | 2020/215996 | A1 | 10/2020 |
| WO | 2021/133239 | A1 | 7/2021 |

OTHER PUBLICATIONS

Notice of Reasons for Refusal issued by the Japanese Patent Office
on May 19, 2025 in corresponding JP Patent Application No.
2021-136655, with English translation.
Chinese Office Action issued by the China National Intellectual
Property Administration on Dec. 12, 2025 in corresponding CN
Patent Application No. 202210996538.7, with English translation.

* cited by examiner

F I G. 1
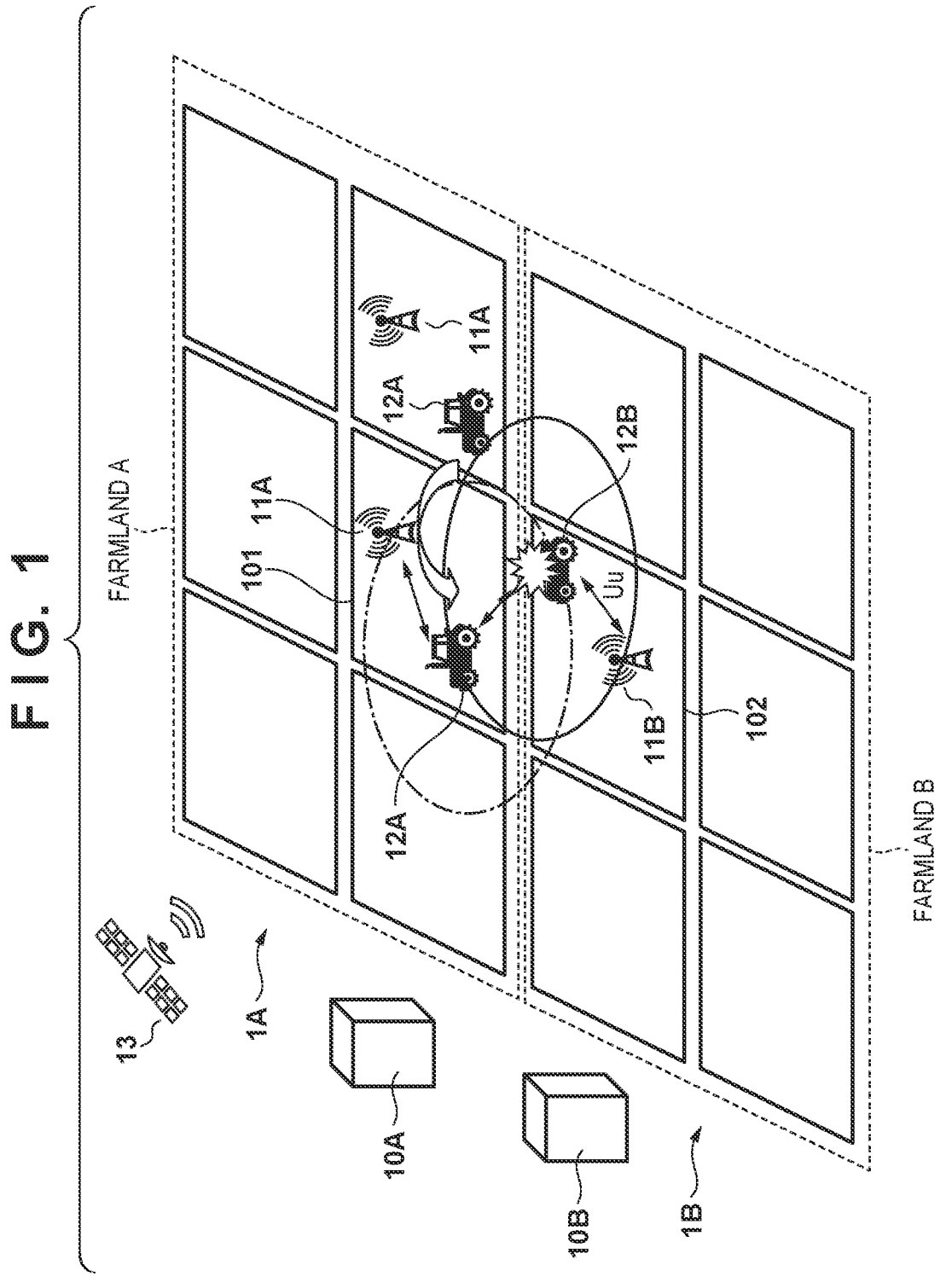

FIG. 2

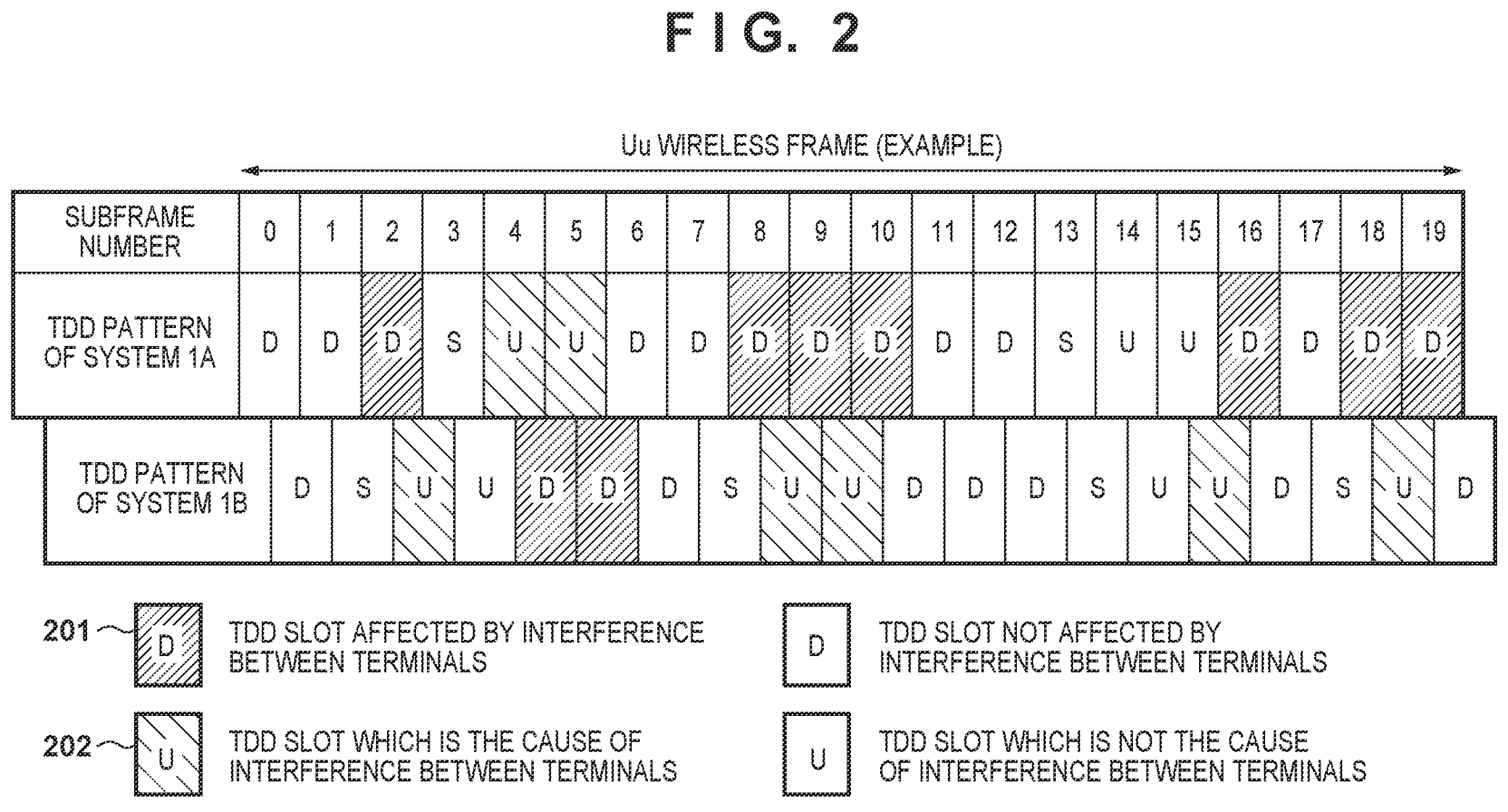

Uu WIRELESS FRAME (EXAMPLE)

| SUBFRAME NUMBER | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| TDD PATTERN OF SYSTEM 1A | D | D | D | S | U | U | D | D | D | D | D | D | D | S | U | U | D | D | D | D |
| TDD PATTERN OF SYSTEM 1B | D | D | S | U | U | D | D | S | U | U | U | D | D | S | U | U | U | D | S | U |

201 — TDD SLOT AFFECTED BY INTERFERENCE BETWEEN TERMINALS / TDD SLOT NOT AFFECTED BY INTERFERENCE BETWEEN TERMINALS

202 — TDD SLOT WHICH IS THE CAUSE OF INTERFERENCE BETWEEN TERMINALS / TDD SLOT WHICH IS NOT THE CAUSE OF INTERFERENCE BETWEEN TERMINALS

D

U

F I G. 3
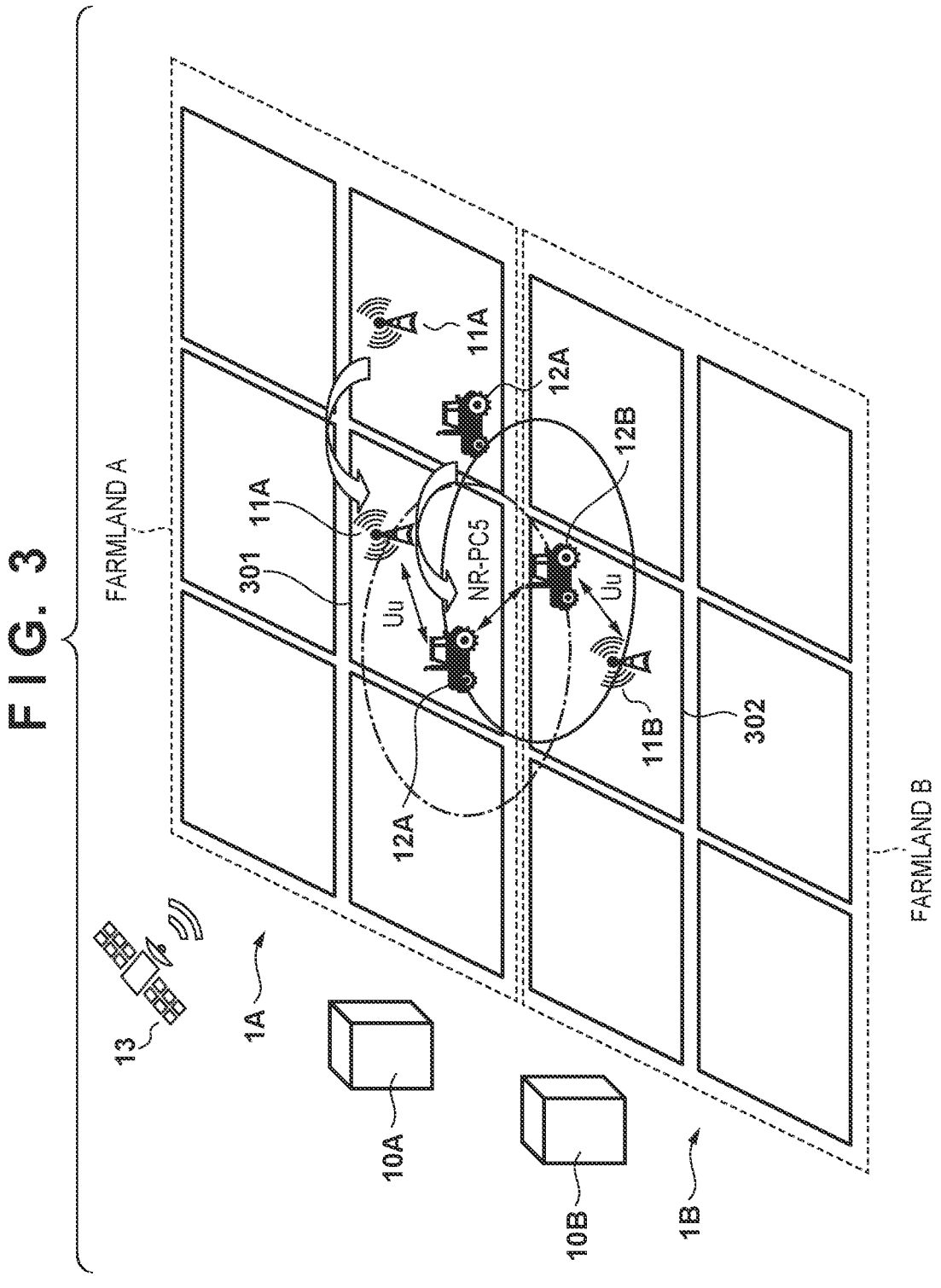

F I G. 4

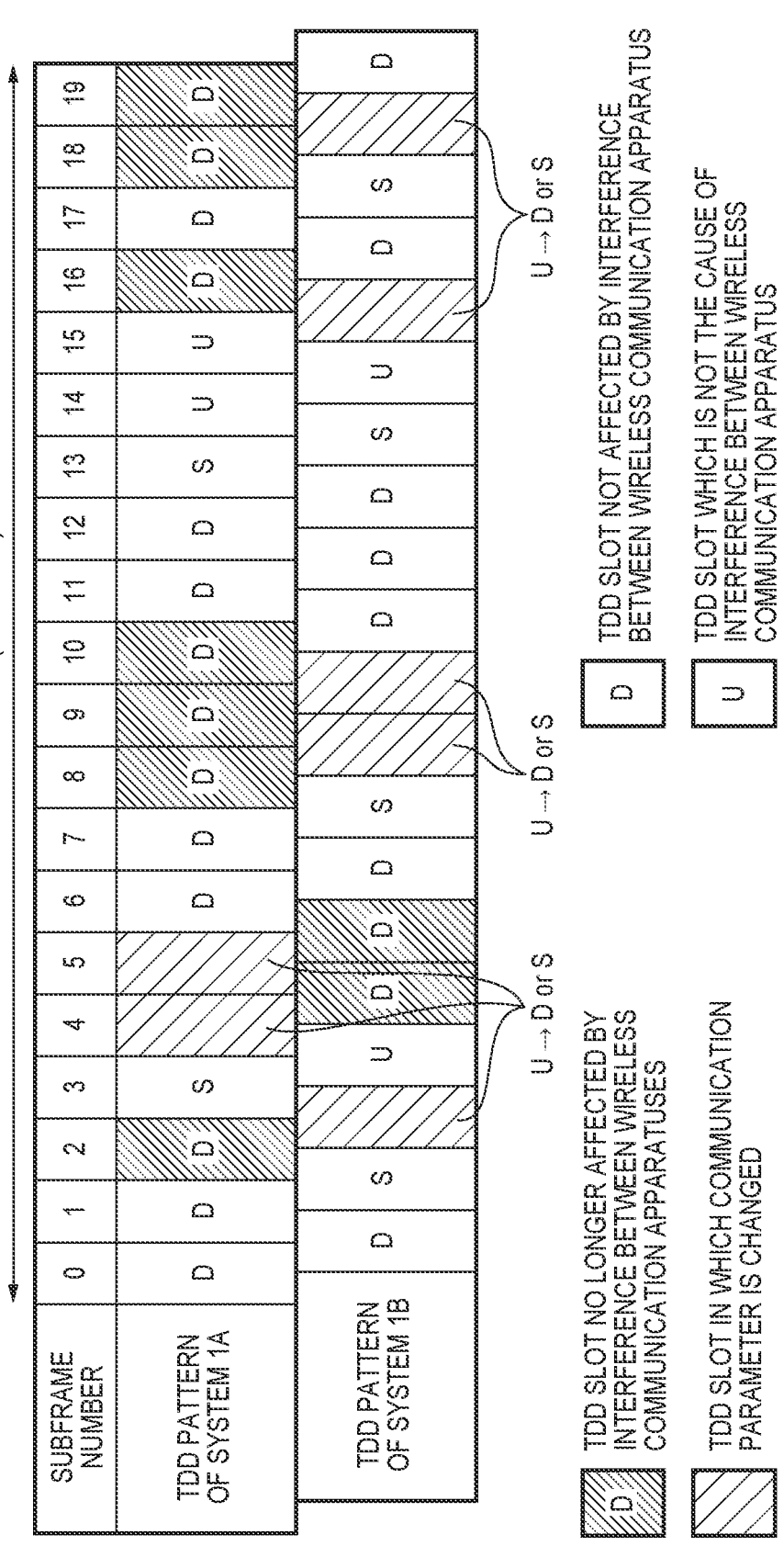

Uu WIRELESS FRAME (EXAMPLE)

| SUBFRAME NUMBER | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| TDD PATTERN OF SYSTEM 1A | D | D | D | S | | | D | D | D | D | D | D | D | S | U | U | D | D | D | D |
| TDD PATTERN OF SYSTEM 1B | D | S | | | U | D | D | D | S | | | D | D | D | S | U | | D | S | D |

U → D or S

U → D or S

U → D or S

D   TDD SLOT NOT AFFECTED BY INTERFERENCE BETWEEN WIRELESS COMMUNICATION APPARATUS

U   TDD SLOT WHICH IS NOT THE CAUSE OF INTERFERENCE BETWEEN WIRELESS COMMUNICATION APPARATUS

D   TDD SLOT NO LONGER AFFECTED BY INTERFERENCE BETWEEN WIRELESS COMMUNICATION APPARATUSES

TDD SLOT IN WHICH COMMUNICATION PARAMETER IS CHANGED

F I G. 5
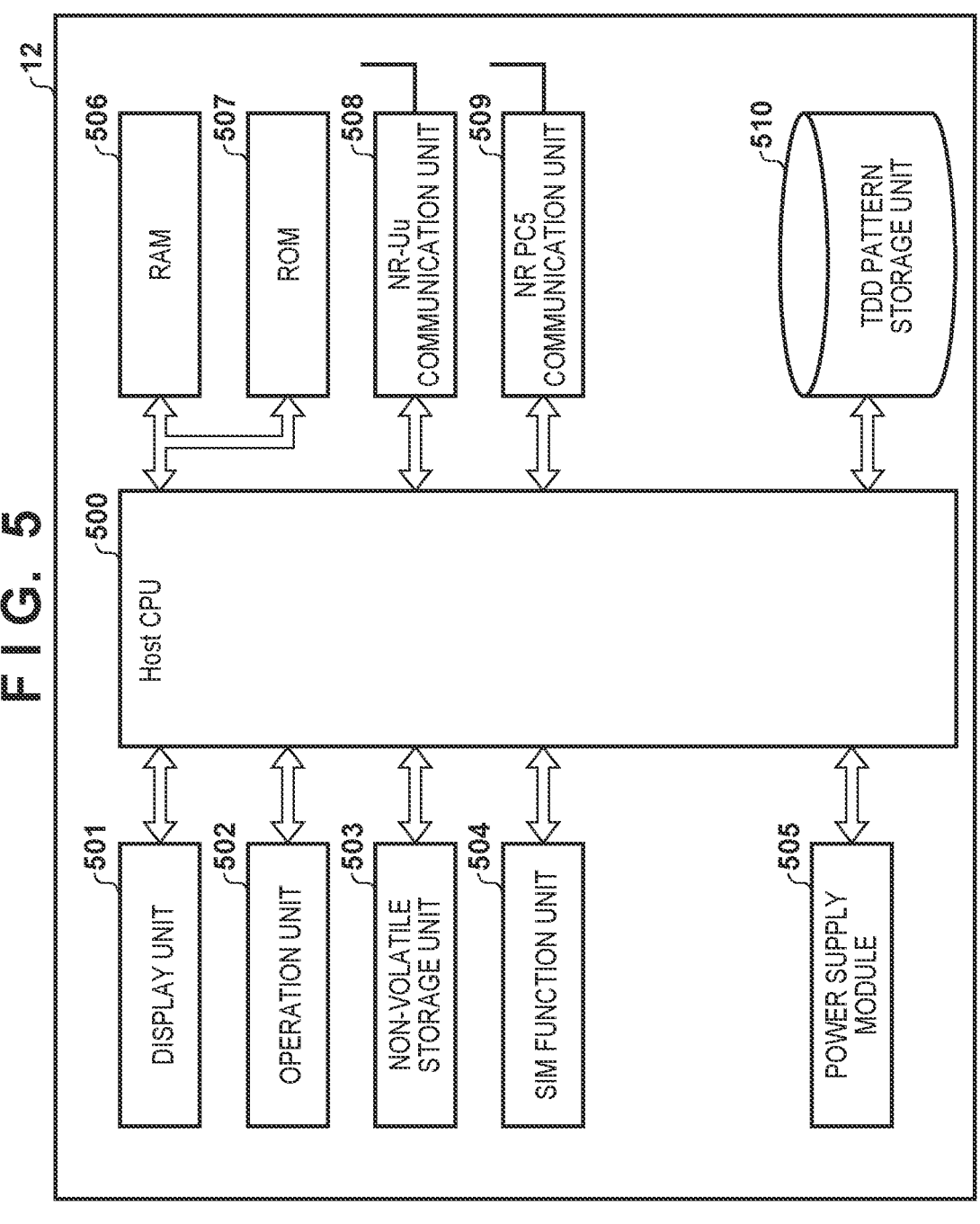

F I G. 6
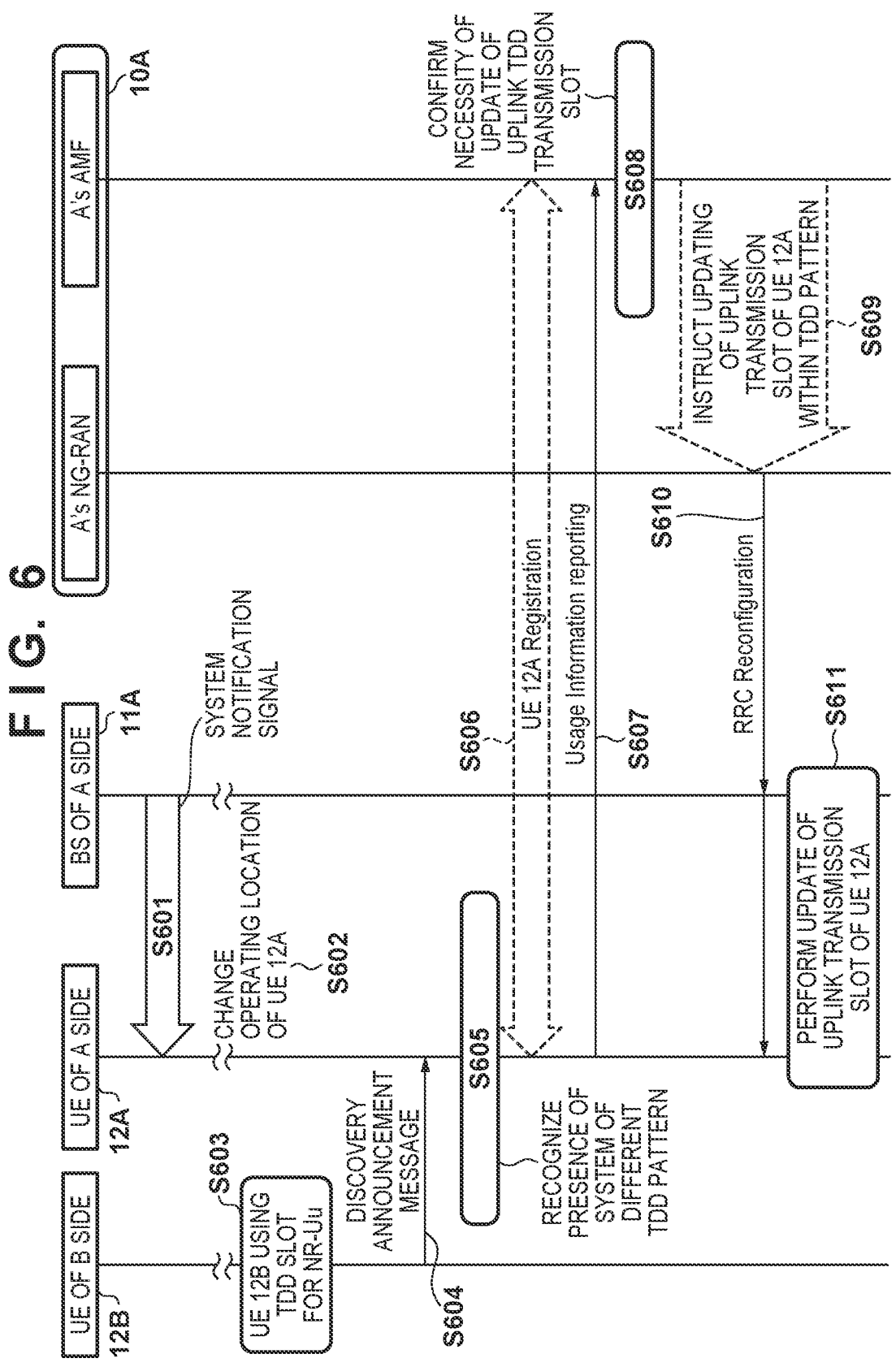

F I G.  9
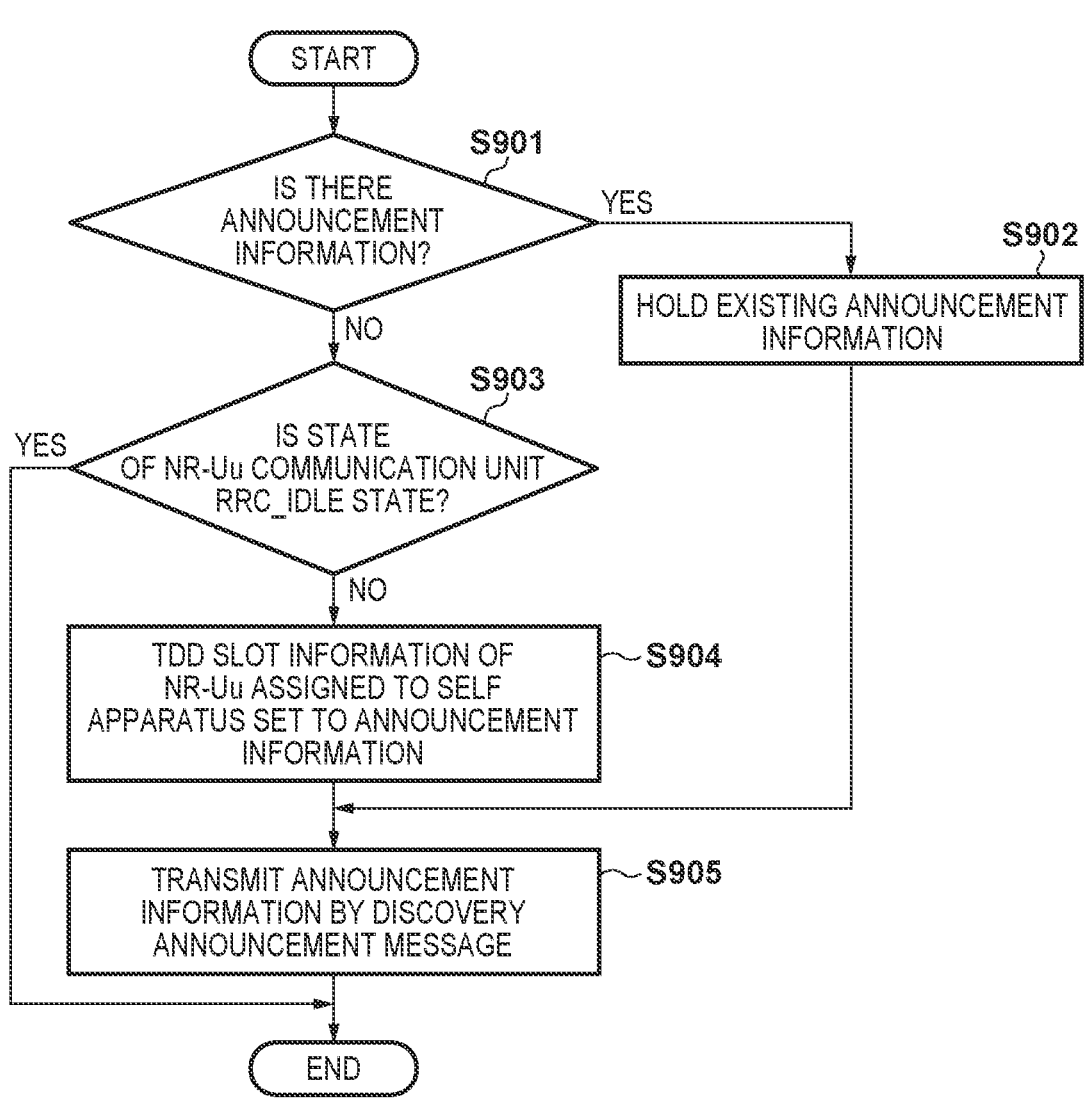

F I G. 10

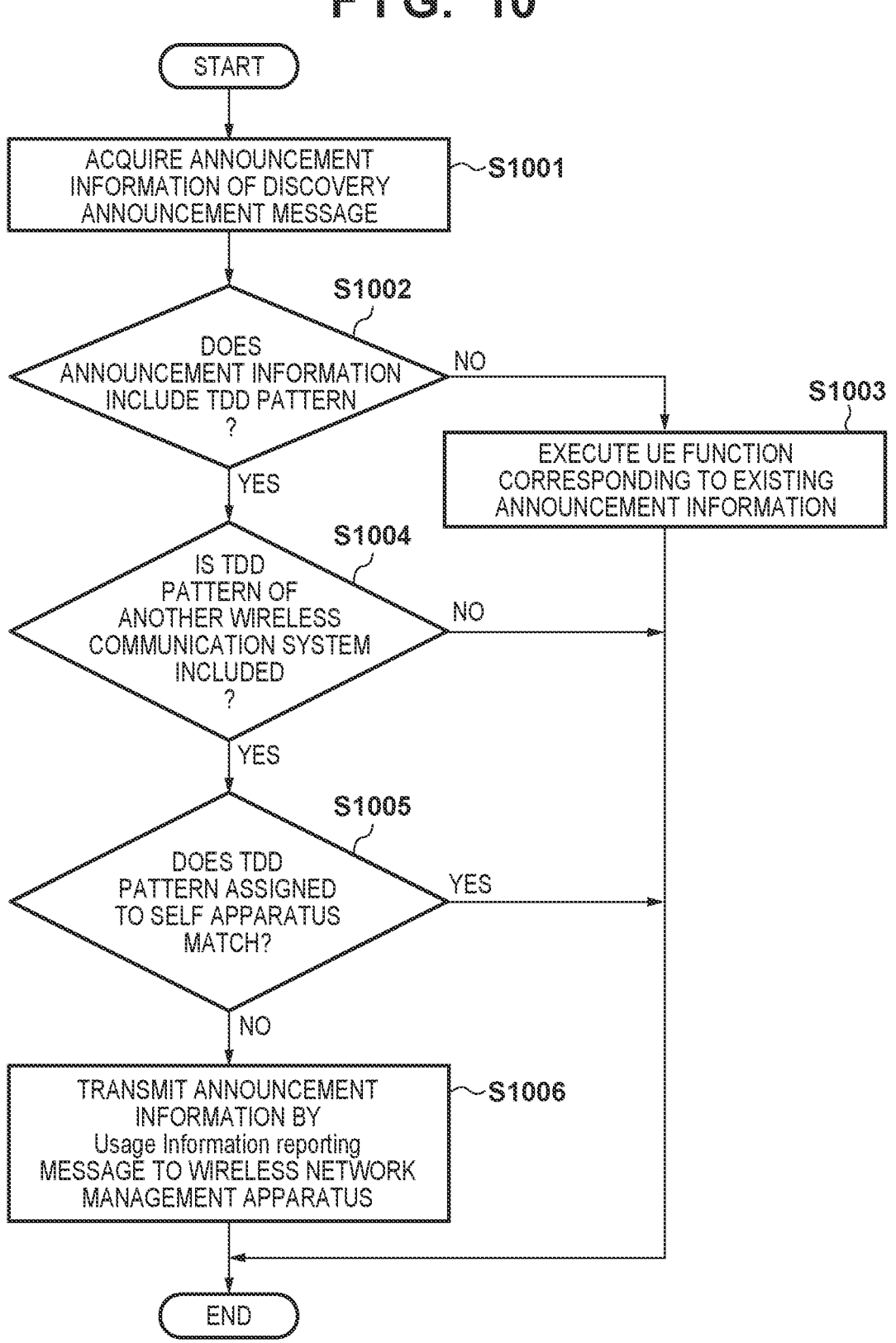

START

ACQUIRE ANNOUNCEMENT INFORMATION OF DISCOVERY ANNOUNCEMENT MESSAGE — S1001

DOES ANNOUNCEMENT INFORMATION INCLUDE TDD PATTERN ? — S1002

NO

YES

EXECUTE UE FUNCTION CORRESPONDING TO EXISTING ANNOUNCEMENT INFORMATION — S1003

IS TDD PATTERN OF ANOTHER WIRELESS COMMUNICATION SYSTEM INCLUDED ? — S1004

NO

YES

DOES TDD PATTERN ASSIGNED TO SELF APPARATUS MATCH? — S1005

YES

NO

TRANSMIT ANNOUNCEMENT INFORMATION BY Usage Information reporting MESSAGE TO WIRELESS NETWORK MANAGEMENT APPARATUS — S1006

END

F I G. 11

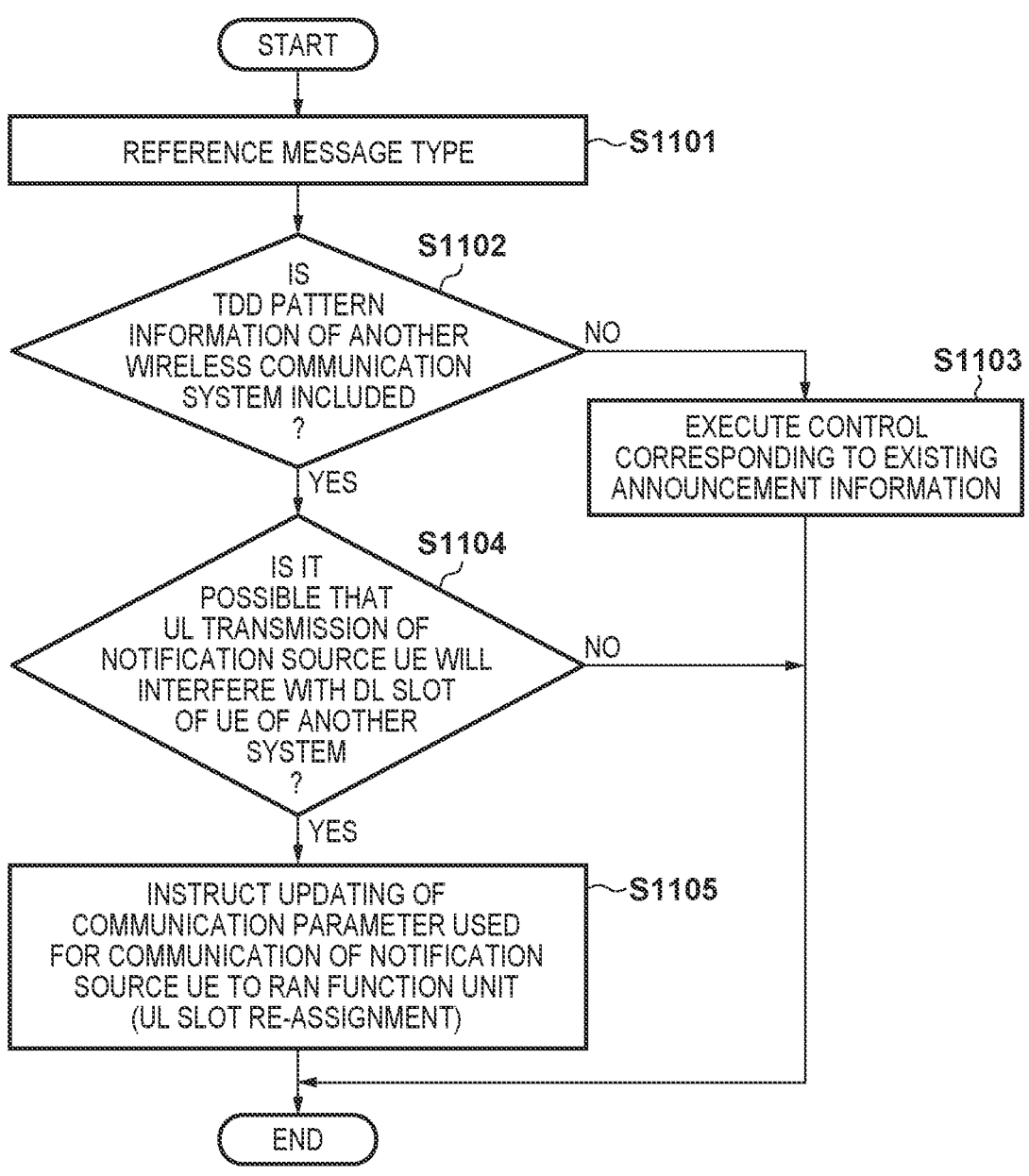

START

REFERENCE MESSAGE TYPE ~S1101

IS TDD PATTERN INFORMATION OF ANOTHER WIRELESS COMMUNICATION SYSTEM INCLUDED ? — S1102

NO

EXECUTE CONTROL CORRESPONDING TO EXISTING ANNOUNCEMENT INFORMATION — S1103

YES

IS IT POSSIBLE THAT UL TRANSMISSION OF NOTIFICATION SOURCE UE WILL INTERFERE WITH DL SLOT OF UE OF ANOTHER SYSTEM ? — S1104

NO

YES

INSTRUCT UPDATING OF COMMUNICATION PARAMETER USED FOR COMMUNICATION OF NOTIFICATION SOURCE UE TO RAN FUNCTION UNIT (UL SLOT RE-ASSIGNMENT) ~S1105

END

F I G. 13

| 1301 | 1302 | 1303 | 1304 |
|---|---|---|---|
| DESTINATION IDENTIFIER (Unicast ID) | TRANSMISSION SOURCE IDENTIFIER (Source Layer2 ID) | MESSAGE TYPE (Direct Discovery Response) | PAYLOAD (Announcement Info.) |

| Neighborhood Uu TDD Pattern Info. | Number of Information elements | System ID (ex. PLMN-ID) Info 1 | Frame Pattern Info 1 | Tx Timing Info 1 | Rx Timing Info 1 | · · · · | System ID (ex. PLMN-ID) Info n | Frame Pattern Info n | Tx Timing Info n | Rx Timing Info n |
|---|---|---|---|---|---|---|---|---|---|---|
| 1341 | 1342 | 1343 | 1344 | 1345 | 1346 | | 13n3 | 13n4 | 13n5 | 13n6 |

F I G. 14
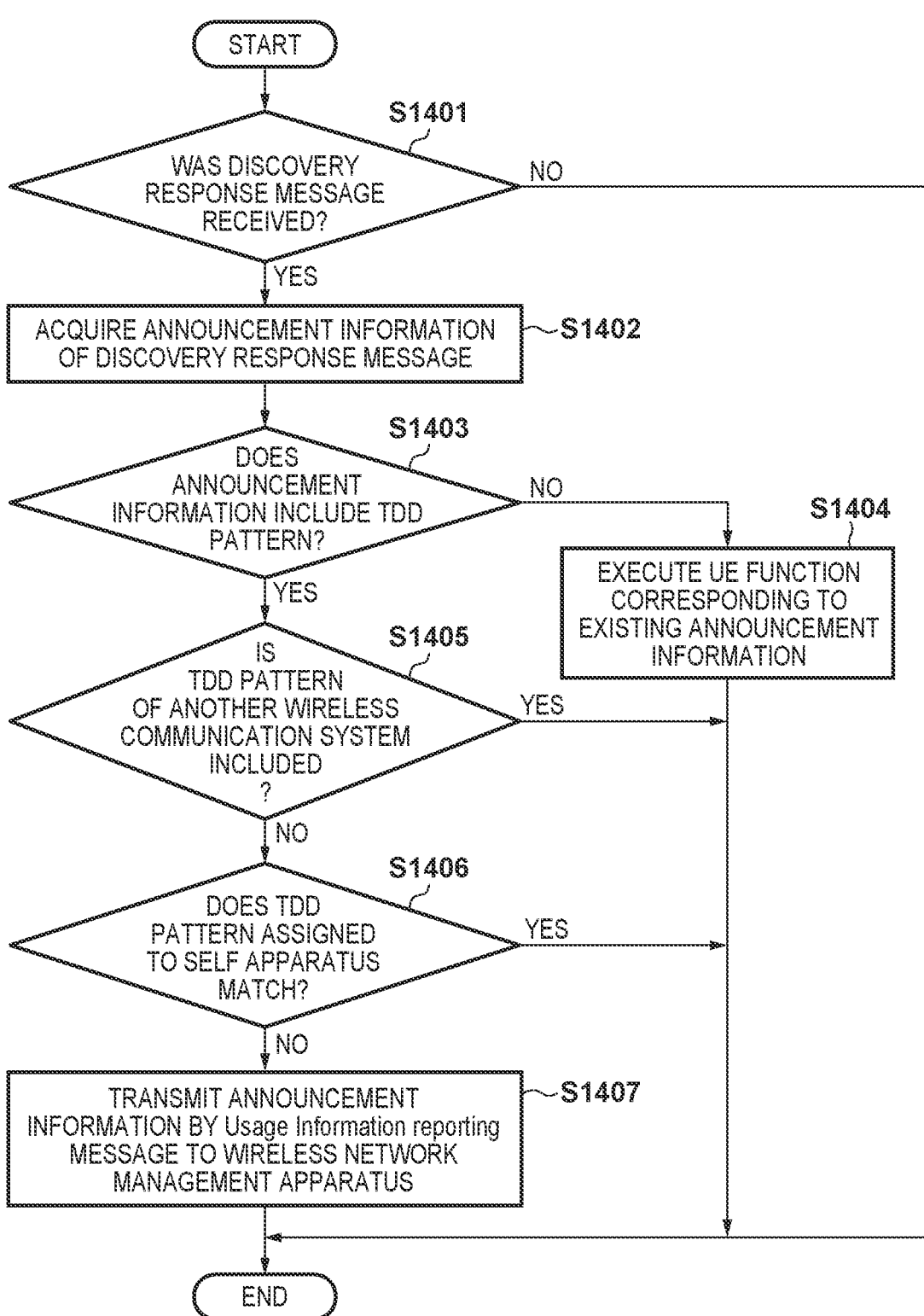

WIRELESS COMMUNICATION APPARATUS,
WIRELESS NETWORK MANAGEMENT
APPARATUS, CONTROL METHOD, AND
NON-TRANSITORY COMPUTER-READABLE
STORAGE MEDIUM

BACKGROUND OF THE INVENTION

Field of the Invention

The present invention relates to a wireless communication apparatus configured to collect information on another wireless communication system operating in the neighborhood, a wireless network management apparatus, a control method, and a non-transitory computer-readable storage medium.

Description of the Related Art

Japanese Patent Laid-Open No. 2020-156042 discloses a system in which a plurality of wireless cellular network systems are installed in the same area and a wireless system to be used is selected in consideration of a load status.

Japanese Patent Laid-Open No. 2019-208270 discloses a system in which a backbone wireless network is accessed via another wireless communication apparatus, by using a wireless communication medium for direct inter-apparatus communication.

Furthermore, there is a control system implementing unmanned operation by apparatuses, having a cellular communication function, cooperating within a private land, such as a farmland or quarry, uniquely provided with such a wireless cellular network system.

The control method described in Japanese Patent Laid-Open No. 2020-156042 requires a person with a license for the wireless network system to go through essential adjustment work to secure wireless channels assigned to wireless communication apparatuses, to prevent occurrence of interference to wireless communication apparatuses in other systems, and this is a burden to the person with a license.

In view of this, establishment of the wireless communication system involves a task of detecting possible interference of signal transmission in the wireless communication system on communications in another wireless communication system.

SUMMARY OF THE INVENTION

The present invention has been made in view of the above-mentioned task, and an object of the present invention is to provide a technique enabling a detection of possible interference of signal transmission in a wireless communication system on communications in another wireless communication system.

In order to solve the problems described above, a wireless communication apparatus according to the present invention includes a first wireless communication unit configured to perform wireless communications with a first base station belonging to a first wireless communication system, a second wireless communication unit configured to perform wireless communications between wireless communication apparatuses not via the first base station, an acquisition unit configured to acquire, via the second wireless communication unit, an operating information message including pattern information indicating a time division transmission/reception pattern between a second base station belonging to a second wireless communication system different from the first wireless communication system and a second wireless communication apparatus belonging to the second wireless communication system, and a notifying unit configured to notify the first base station of the pattern information acquired by the acquisition unit, via the first wireless communication unit.

The present invention can provide a technique enabling possible interference of signal transmission in a wireless communication system on communications in another wireless communication system to be detected.

Further features of the present invention will become apparent from the following description of exemplary embodiments (with reference to the attached drawings).

BRIEF DESCRIPTION OF THE DRAWINGS

FIG. 1 is a schematic diagram illustrating a situation where interference occurs between wireless communication apparatuses belonging to different wireless communication network systems;

FIG. 2 is a schematic diagram illustrating an example of assignment of transmission/reception slots for a plurality of wireless communication systems between which radio frequency interference may occur;

FIG. 3 is a schematic diagram illustrating a wireless communication system according to the present embodiment;

FIG. 4 is a diagram illustrating an example of reassignment of transmission/reception slots of the wireless communication system according to the present embodiment:

FIG. 5 is a functional block diagram of the wireless communication apparatus according to the present embodiment;

FIG. 6 is a sequence diagram illustrating an example of processing executed by a wireless communication system according to a first embodiment, when a wireless communication apparatus approaches:

FIG. 9 is a flowchart illustrating an example of processing executed by the wireless communication apparatus according to the first embodiment:

FIG. 10 is a flowchart illustrating an example of processing executed by the wireless communication apparatus that has received an operating information notification message of the wireless communication system from the wireless communication apparatus according to the first embodiment through direct wireless communications;

FIG. 11 is a flowchart illustrating an example of processing executed by a wireless network management apparatus that has received an operating information notification message of the wireless communication system from the wireless communication apparatus according to the first embodiment through wireless communications via a base station:

FIG. 13 is a diagram illustrating a format example of an operating information notification message of the wireless communication system transmitted through direct wireless communications according to the second embodiment; and FIG. 14 is an example flowchart of additional control performed by a wireless network management apparatus that has received an operating information notification message of the wireless communication system from the wireless communication apparatus according to the second embodiment through direct wireless communications.

DESCRIPTION OF THE EMBODIMENTS

Figures 7, 8:
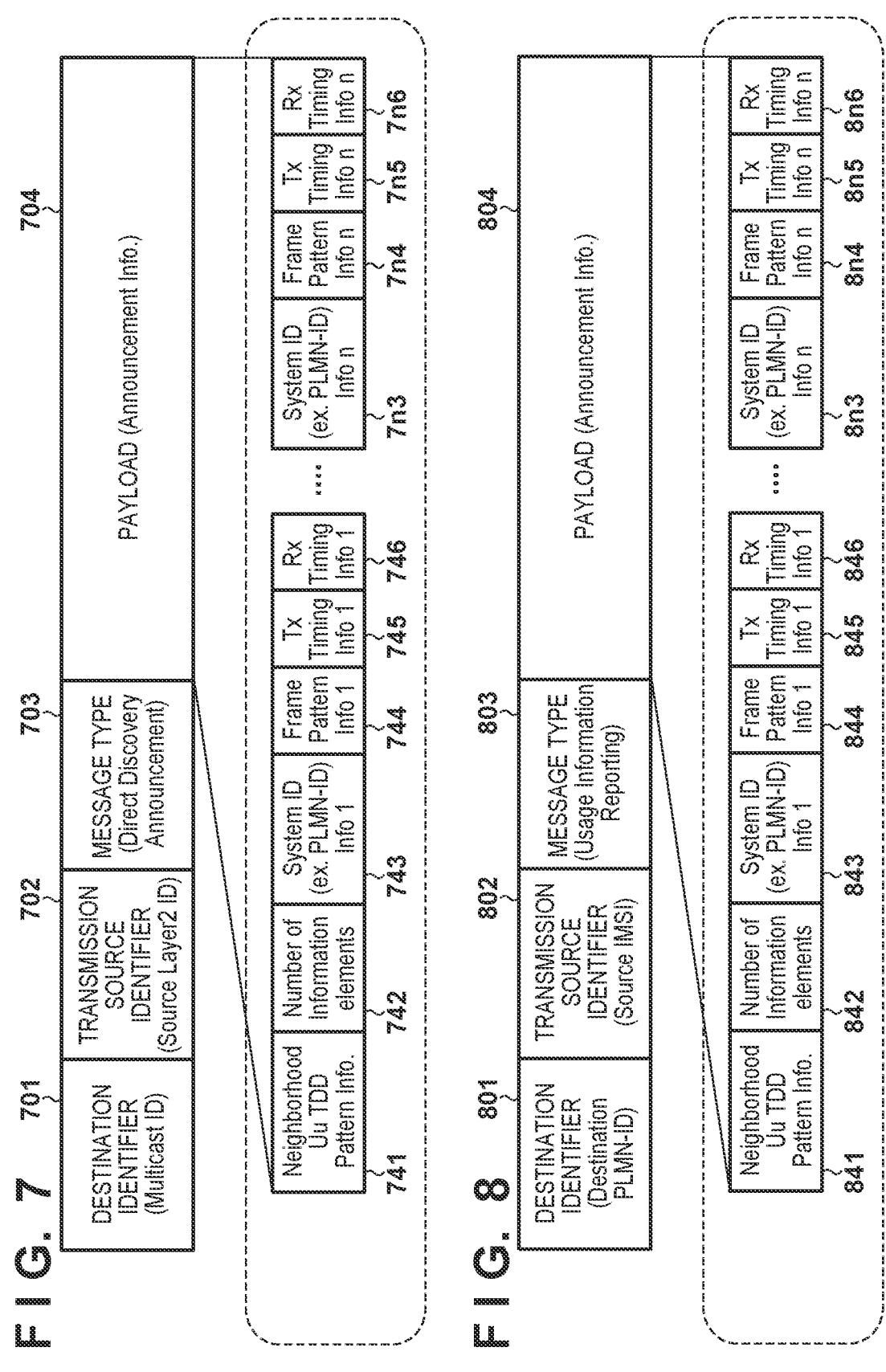
FIG. 7 is a diagram illustrating a message format example for notification of operating information of the wireless communication system transmitted through direct wireless communications according to the first embodiment.
FIG. 8 is a diagram illustrating a message format example for notification of operating information of another wireless communication system, from the wireless communication apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First of all, a situation under which interference between wireless communication apparatuses belonging to different wireless communication networks occurs will be described with reference to FIG. 1. Note that in the present embodiment, a wireless communication system is described as an agricultural system employing a wireless local network (local 5G wireless communication network) conforming to the fifth generation mobile communication system.

In the agricultural system, information is expected to be collected such as automatic control related instructions to an agricultural machine operating in a farmland, and an operation status of the agricultural machine. In such an agricultural system, it suffices to set an area where the agricultural machine is present as a service area, meaning that always setting the entire farmland as the service area could be redundant. In view of this, a system has been started to be introduced, which provides a wireless communication network in which a local 5G wireless base station moves together with the area where the agricultural machine is present (operation area). The agricultural machine is equipped with a wireless communication apparatus (UE) configured to communicate with the wireless base station (BS).

FIG. 1 illustrates an example of a system mode employing an automatic control solution for an agricultural machine (such as a tractor) supporting local 5G wireless communication control in farmlands A and B adjacent to each other. The agricultural machine (such as a tractor) is also expected to be autonomously driven on public roads, and thus supports direct wireless communications between wireless communication apparatuses for acquiring information from roadside equipment such as road signs or traffic lights, not via a base station in which satellite communications are employed whereby system synchronization operations are guaranteed. The present embodiment is described with the direct wireless communications assumed to be wireless communications between wireless communication apparatuses using an NR-PC5 interface.

FIG. 1 illustrates a BS 11A and a BS 11B (which may be hereinafter referred to as BS 11 when not being distinguished from each other) and a UE 12A and a UE 12B (which may be hereinafter referred to as UE 12 when not being distinguished from each other). For the sake of coexistence with the NR-PC5, the BS 11 and the UE 12 correspond to a satellite positioning system GNSS 13 and can acquire position information and time information.

Furthermore, through synchronization of a system clock used for operations by the wireless communication apparatuses based on the time information acquired from the GNSS 13, a width of deviation in timing for wireless time division multiplex (TDD) communications is reduced.

The farmlands A and B are divided into sections (six sections in the example illustrated in FIG. 1), each of which can be covered by a single BS 11. In each section, farm work is performed using an autonomously driven tractor equipped with the UE 12.

When the farm work in one section in the farmland A ends, the wireless BS 11A is moved to a section 101 (a section adjacent to a section 102, in the farmland B, in which the farm work is being executed) where the farm work is to be performed next, and then restarted.

When the farm work is executed in the sections 101 and 102 with the BS 11 forming a service area in these adjacent sections, in case of an asynchronous local 5G wireless communication system, radio frequency interference may occur between the wireless communication apparatuses depending on a transmission/reception pattern (TDD pattern).

Referring now to FIG. 2, an example of assignment of a transmission/reception pattern to which radio frequency interference may occur in an adjacent wireless communication network will be described. In FIG. 2, D indicates a downlink slot (DL slot) in which data is transmitted from the BS 11 to the UE 12, and U indicates an uplink slot (UL slot) in which data is transmitted from the UE 12 to the BS 11.

In the DL slot, a gain of a wireless reception circuit of the UE 12 is set to be relatively high, to receive and decode a signal from the BS 11 at a distant location. When a signal is transmitted in the DL slot from another wireless communication apparatus present in the neighborhood, due to a signal transmitted from the other wireless communication apparatus, a signal-to-noise ratio (SN ratio) of a signal transmitted from the BS 11 may be degraded, and reception of the signal from the BS 11 may fail. Such failure in reception of data from BS 11 due to signal transmission from the other UE 12 in the DL slot is referred to as the radio frequency interference between the wireless communication apparatuses.

In the example of FIG. 2, the radio frequency interference between the wireless communication apparatuses occurs in a DL slot 201 hatched by diagonal lines, due to a UL slot 202 hatched by lines from a neighbor UE.

FIG. 3 illustrates a wireless communication system according to the present embodiment applied to an agricultural system of a local 5G wireless communication system.

In a work location of the agricultural machine equipped with the UE 12A in the farmland A, information on a time division transmission/reception pattern of a neighborhood wireless communication system is acquired, to prevent interference of radio waves transmitted by the UE 12A in the UL slot after the movement, with other wireless communication systems. When it is determined that the interference is likely to occur, a communication parameter of the UL slot assigned to the UE 12A is changed. For example, the slot assignment is updated to change the UL slot assigned to the UE 12A to a DL slot or a synchronization slot.

An example of transmission/reception slot reassignment in the wireless communication system according to the present embodiment will be described with reference to FIG. 4. A wireless communication system 1A illustrated in FIG. 4 acquires information on slot assignment for a system 1B that is a local 5G wireless communication system present in the neighborhood. Of TDD slots to which the UL slot 202 that may cause interference between the UEs 12 is assigned, a slot at least partially overlapping with the DL slot 201 of the system 1B is changed to a DL slot or a synchronization slot (S slot). Thus, the interference between the wireless communication apparatuses in the DL slot of the wireless communication system 1B can be avoided.

Next, functional blocks of the UE 12 equipped in the agricultural machine will be described with reference to FIG. 5.

The UE 12 includes a CPU 500, a display unit 501, an operation unit 502, a non-volatile storage unit 503 such as a memory card, a subscriber identity module (SIM) function unit 504, a RAM 506, and a ROM 507. Furthermore, the UE 12 includes an NR-Uu communication unit 508 used for communication with a wireless base station, an NR-PC5 communication unit 509 used for direct communication between apparatuses, and a TDD pattern storage unit 510 that stores information on the TDD pattern assigned from a wireless network management apparatus 10. The CPU 500 is a control unit that is in charge of control on the UE as a whole, and deploys and executes, on the RAM 506, a program stored in the ROM 507 or the non-volatile storage unit 503. The display unit 501 is a display device configured to perform predetermined notification to a user, and is a touch display, for example, when the UE 12 is a smartphone. The operation unit 502 is a user interface (UI) configured to accept an operation from a user, and is a touch display, for example, when the UE 12 is a smartphone.

The SIM function unit 504 is a module that includes subscriber identity information for connecting to the wireless communication system 1 as the UE 12, and executes authentication processing and the like for connecting to the wireless communication system 1.

Next, an example of processing executed by the wireless communication system according to the first embodiment, when a wireless communication apparatus approaches will be described with reference to FIG. 6.

First of all, in S601, the BS 11A transmits a notification signal for notifying system parameters of the wireless communication system 1A by broadcast transmission, and the UE 12A receives the notification signal. Upon receiving the notification signal, the UE 12A establishes connection with the BS 11A, by using a known technique such as a random access procedure for the BS 11A.

Then, in S602, a control signal instructing movement is transmitted to the agricultural machine equipped with the UE 12A via the BS 11A. Then, the agricultural machine moves to the section adjacent to the system 1B. The BS 11A also moves to the corresponding section.

It is assumed that, in S603, the UE 12B has established connection with the BS 11B, the agricultural machine equipped with the UE 12B is operating in a section 302 in FIG. 3, and the agricultural machine equipped with the UE 12A is operating in a section 301 in FIG. 3.

Then, in S604, the UE 12B under the operation transmits a discovery announcement message as an operating information message for the notification of the TDD pattern to the other wireless communication apparatus via a direct wireless communication interface. In the example illustrated in FIG. 6, the discovery announcement message transmitted from the UE 12B is received by the UE 12A. Based on the discovery announcement message received in S604, the UE 12A determines whether a wireless communication system with a TDD pattern different from the TDD pattern assigned to the UE 12A is present in the neighborhood of the UE 12A, in S605. In the example illustrated in FIG. 6, the system 1B is operating under the TDD pattern different from that of the system 1A. Thus, the UE 12A that has received the discovery announcement message determines that the wireless communication system under a pattern with slot assignment different from that for the system 1A is present.

Thus, the UE 12A advances the processing to S606 to register the UE 12A in a wireless network management apparatus 10A, and advances the processing to S607 to transmit the information indicating the TDD pattern in the wireless communication system 1B received in S604.

Then, the processing proceeds to S608, and the wireless network management apparatus 10A identifies the TDD pattern in the other wireless communication system by the information received in S607, and identifies the UL slot of the UE 12A that may interfere with the DL transmission by the other wireless communication system.

Upon determining that there is UL transmission from the UE 12A that may interfere with the DL transmission by the wireless communication system 1B, the wireless network management apparatus 10A advances the processing to S609 to issue an instruction to avoid the interference. For example, an instruction to update the TDD pattern, an instruction on directivity of an antenna used by the UE 12A for the transmission, an instruction on the transmission of power of the UE 12A, and an instruction on a frequency channel used by the UE 12A for the transmission are issued. In this example, a description is given assuming that AMF of the wireless network management apparatus 10A issues an instruction to update the slot to NG-RAN.

Next, in S610, the NG-RAN of the wireless network management apparatus 10A transmits an RRC reconfiguration message to the BS 11A, which changes the UL slot that may interfere with the DL transmission of the wireless communication system 1B to the DL slot or the S slot in which a synchronization signal is transmitted. The BS 11A transmits an updated TDD pattern to the UE 12A.

Then, the BS 11A and the UE 12A operate under the TDD pattern updated in S611. Thus, the UL transmission from the UE 12A can be avoided when the UE 12B is operating with the DL slot.

Next, with reference to FIG. 7, a message format of an operating information notification message of a wireless communication system transmitted through direct wireless communications according to the present embodiment will be described.

FIG. 7 illustrates an example of an operating information notification message of a wireless communication system using a direct communication protocol NR-PC5 for the local 5G. The operating information notification message illustrated in FIG. 7 is an operating information message for the broadcast notification used by the UE 12B for the notification of the TDD pattern in S604 in FIG. 6.

A destination identifier 701 is a region for designating a multicast ID or a groupcast ID for designating a wireless communication apparatus that is a destination. In the present embodiment, for example, a multicast ID receivable by any wireless communication apparatus is set.

A transmission source identifier 702 is a region for designating an identifier with which a wireless communication apparatus that is a transmission source can be identified. In the present embodiment, a Layer2 ID is set. A message type 703 indicates a type of a message using the NR-PC5. In the present embodiment, the message type is set to a value indicating the "Direct Discovery Announcement".

A payload 704 stores announcement information including information for the notification of the TDD pattern in the wireless communication system. In the payload 704, an announcement type region 741 and number of information elements 742 are set. In the announcement type region 741, a value corresponding to "Neighborhood Uu TDD Pattern Information" indicating that the announcement information is the TDD pattern of a neighborhood Uu is set. The number of information elements 742 indicates the number of TDD patterns notified. Furthermore, as the TDD pattern information, for example, system ID information 743 in which a value indicating the wireless communication system such as PLMN ID is set, frame pattern information 744, transmission timing information 745, and reception timing information 746 are set. Furthermore, a plurality of pieces of the TDD pattern information indicating operating information on the wireless communication system may be included. In this case, the payload 704 may store a plurality of pieces of the TDD pattern information including the system ID information, the TDD pattern information, the transmission timing information, and the reception timing information. For example, when the UE 12B belongs to a plurality of wireless communication systems, a plurality of pieces of TDD pattern information may be included in the payload 704.

Next, with reference to FIG. 8, a description will be given on the format of the operating information notification (usage information reporting) message transmitted to the wireless network management apparatus 10A in S607 from the UE 12A that has received the discovery announcement. The notification message illustrated in FIG. 8 is an example of a message format for the notification of operating information on the other wireless communication system using an NR-Uu, used for the transmission from the UE 12A to the wireless network management apparatus 10A in S607 in FIG. 6.

A destination identifier 801 is a Public Land Mobile Network-Identifier of the notification destination of the TDD pattern. A transmission source identifier 802 is the identifier of the UE 12A. A message type 803 is information indicating the type of the message. In the present embodiment, a value indicating the Usage Information Reporting is set in the message type 803. A payload 804 has information set therein that is the same as that in the payload 704 in FIG. 7 and thus the description thereof will be omitted.

Next, an example of processing executed by the UE 12B will be described with reference to FIG. 9. The processing illustrated in FIG. 9 is executed by the UE 12B at a transmission timing of predetermined NR-PC5 announcement information.

First of all, in S901, presence or absence of announcement information indicating transmission standby is determined. The processing proceeds to S902 when the announcement information indicating the transmission standby is present, and otherwise proceeds to S903. In S902, the existing announcement information is transmitted as an announcement message. In S903, whether the NR-Uu communication unit 508 is in an RRC_IDLE state with no wireless communication resource assigned from the BS 11 is determined. When the NR-Uu communication unit 508 is in the RRC_IDLE state (YES in S903), the processing in FIG. 9 is terminated. When the NR-Uu communication unit 508 is in a state other than the RRC_IDLE state (NO in S903), a wireless communication resource information for the NR-Uu communication via the base station assigned to the own apparatus is set to be the operating information notification message as illustrated in FIG. 7.

Then, in S905, the UE 12B transmits the announcement information by the discovery announcement message, and the processing illustrated in FIG. 9 is terminated.

Next, an example of processing executed by the wireless communication apparatus according to the present embodiment will be described with reference to FIG. 10. The processing in FIG. 10 is described as processing executed by the UE 12A notifying the wireless network management apparatus 10A of the operating information on the other wireless communication system 1B. The processing illustrated in FIG. 10 starts when the UE 12A receives the discovery announcement message from the UE 12B through the NR-PC5.

First of all, in S1001, the UE 12A acquires the announcement information included in the discovery announcement message received, and determines whether information on the TDD pattern used by the UE of the other wireless communication system in the neighborhood for the NR-Uu communications is included.

When the announcement information does not include the TDD pattern information (NO in S1002), the UE 12A advances the processing to S1003, to execute the existing processing corresponding to the announcement information.

When the announcement information includes the TDD pattern information (YES in S1002), the UE 12A determines in S1004 whether the announcement information includes the notification of the TDD pattern in the other wireless communication system.

When only the TDD pattern in the wireless communication system that is the same as the wireless communication system 1A to which the UE 12A belongs is included in the announcement information (NO in S1004), the processing illustrated in FIG. 10 is terminated. When the TDD pattern information of the other wireless communication system is included (YES in S1004), the UE 12A advances the processing to S1005, to determine whether the TDD pattern assigned to the UE 12A matches the TDD pattern included in the announcement information received.

When the TDD pattern assigned to the UE 12A is determined to match the TDD pattern included in the announcement information received from the UE 12B (YES in S1005), the UE 12A terminates the processing illustrated in FIG. 10. On the other hand, when the TDD pattern assigned to the UE 12A is determined not to match the TDD pattern included in the announcement information (NO in S1005), the UE 12A advances the processing to S1006. In S1006, the UE 12A transmits a notification message in which information indicating the TDD pattern included in the announcement information received is set, to the wireless network management apparatus 10A.

Thus, when the transmission by the UE 12A is likely to interfere with the wireless communication apparatus waiting for the DL transmission in the other wireless communication system, the wireless network management apparatus 10A can perform communication parameter setting to avoid the interference.

The description on S1005 in FIG. 10 is given assuming that the determination on whether the TDD patterns match is made. Alternatively, assuming a case where the start timing of a Uu wireless frame varies as illustrated in FIG. 4, determination may be made on whether the other wireless communication system performs the DL transmission in a time slot overlapping with that for the UL transmission by the own system. In this case, it is possible to determine that, when the UL slot of the wireless communication system to which the own apparatus belongs overlaps with a plurality of slots of the other wireless communication system, the interference may occur if any one of the plurality of slots is the DL slot.

Next, an example of processing executed by the wireless network management apparatus 10A according to the present embodiment will be described with reference to FIG. 11. The processing illustrated in FIG. 11 is executed when the wireless network management apparatus 10A receives the NR-Uu operating information message (usage information reporting) from the UE 12A that has executed the processing illustrated in FIG. 10.

First of all, in S1101, the wireless network management apparatus 10A determines the message type of the operating information message received, and in S1102, determines whether the message received is a report on the TDD pattern in the other wireless communication system.

When determining that the received message is not the report on the TDD pattern in the other wireless communication system (NO in S1102), the wireless network management apparatus 10A advances the processing to S1103, to execute the existing processing corresponding to the announcement information.

When determining that the received message is the notification on the TDD pattern in the other wireless communication system (YES in Si 102), the wireless network management apparatus 10A advances the processing to S1104, to determine whether the UL transmission by the UE 12A with which the operating information message has been transmitted might interfere with the DL slot of the UE 12B in the other wireless communication system. When determining that the UL transmission by the UE 12A interferes with the DL reception by the UE 12B of the other wireless communication system 1B (YES in S1104), the wireless network management apparatus 10A advances the processing to S1105. When determining that the UL transmission by the UE 12A does not interfere with the DL reception by the UE 12B of the other wireless communication system 1B (NO in S1104), the wireless network management apparatus 10A terminates the processing illustrated in FIG. 11.

In S1105, the wireless network management apparatus 10A instructs the updating of the communication parameter used for communications between the UE 12A and the BS 11A. For example, reassignment of the UL slot assigned to UE 12A is instructed. For example, as described with reference to S609 in FIG. 6, the AMF of the wireless network management apparatus 10A instructs the updating of the UL slot to the NG-RAN.

In an example described in the present embodiment, the communication parameter is updated for avoiding interference, by assigning the slot, assigned as the UL slot to the UE 12A of the other wireless communication system, to the DL slot or the synchronization slot. In another example, the start timing of the Uu wireless frame may be changed, the entire wireless frame may be reconfigured, the directivity of the antenna or the transmission power for the transmission by the UE 12A may be set, or a frequency channel for U-plane communications used for the UL transmission may be changed.

As described above, according to the present embodiment, the wireless network management apparatus can detect the possibility of occurrence of interference with a wireless communication apparatus of the other wireless communication system due to a movement of the base station under management. Thus, the wireless network management apparatus can execute countermeasure processing for avoiding interference on the base station and the wireless communication apparatus under management, so that occurrence of interference with the other system can be avoided.

By detecting the possibility of exerting the interference, reassignment of the TDD slot for preventing the radio frequency interference from occurring can be executed on the wireless network management apparatus side. Thus, the wireless network management apparatus can execute the processing of avoiding the interference, without being operated by an operator such as a person with a license of the wireless communication network system.

Second Embodiment

In the present embodiment, processing for collecting a reception status of a neighbor wireless base station by a response message to a discovery request message transmitted by a wireless communication apparatus will be described. Note that the same configurations, functions, and processing as those of the first embodiment are denoted by the same reference numerals and the description thereof are omitted.

Figure 12:
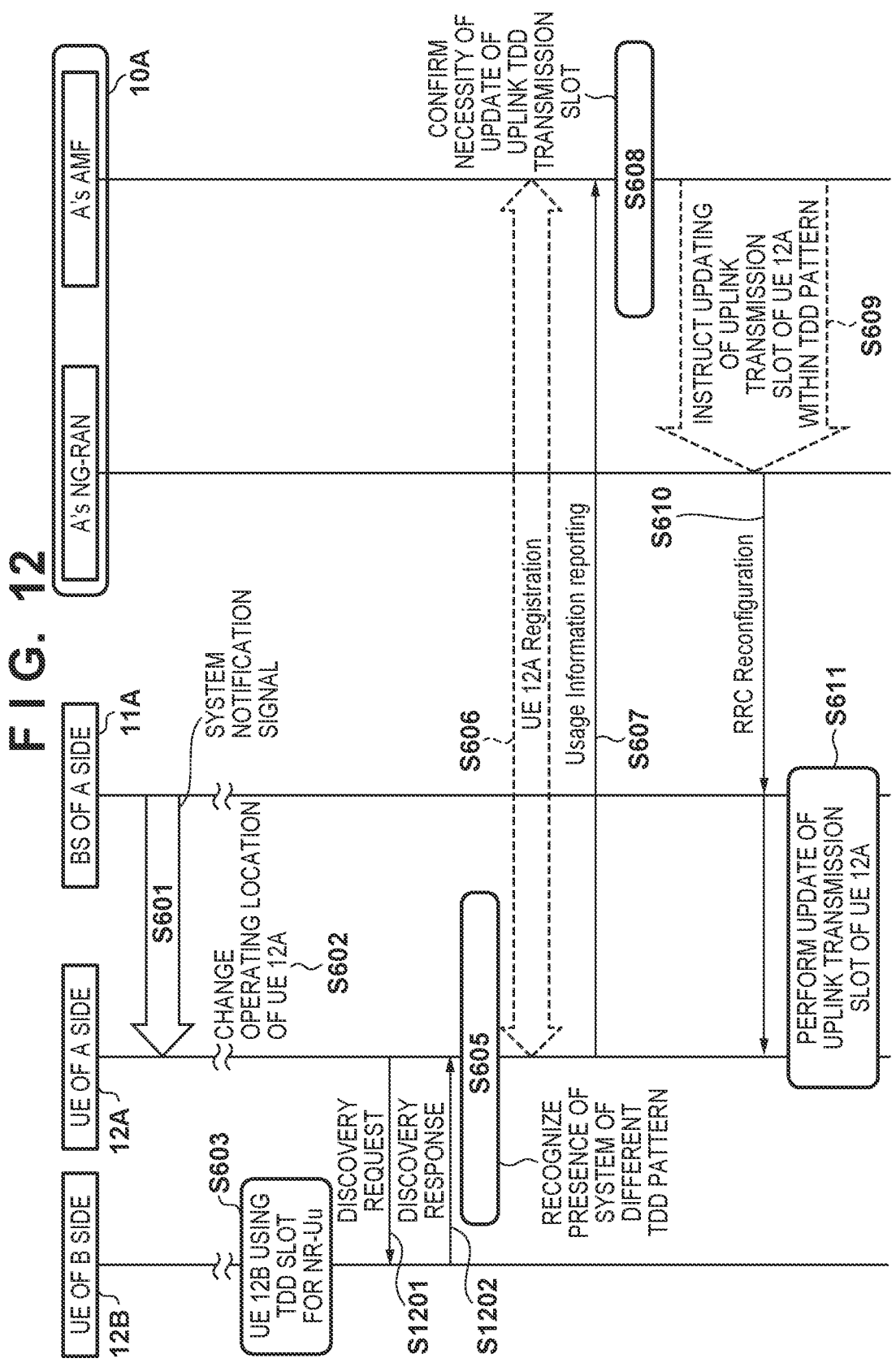
FIG. 12 is a sequence diagram illustrating an example of processing executed by a wireless communication system according to a second embodiment, when a wireless communication apparatus approaches.

FIG. 12 is a sequence diagram illustrating an example of processing executed by the wireless communication system according to the present embodiment, when a wireless communication apparatus approaches.

The processing in S601 to S603 is the same as that of the first embodiment, and thus the description of this processing will be omitted. In S1201, the UE 12A transmits a discovery request message through direct wireless communications. The UE 12B having received the discovery request message through direct wireless communications transmits information indicating the TDD pattern assigned to the UE 12B using the discovery response message in response to the discovery request message, as the operating information message.

Here, the message format of the discovery response message transmitted through the NR-PC5 will be described with reference to FIG. 13. The discovery response message in FIG. 13 is an example of the operating information message for a search response.

In a destination identifier 1301, a unicast ID indicating the identifier of the UE 12A in the direct wireless communications is set.

A transmission source identifier 1302 is a region for designating an identifier with which the wireless communication apparatus as a transmission source can be identified. In the present embodiment, a Layer2 ID is set. A message type 1303 indicates the type of the message using the NR-PC5. In the present embodiment, the message type is set to a value indicating the "Direct Discovery Response".

A payload 1304 has information stored therein that is the same as that in the payload 704 in FIG. 7 and thus the description thereof will be omitted.

Next, processing executed by the UE 12A will be described with reference to FIG. 14. The processing in FIG. 14 is executed by the UE 12A transmitting the discovery request message at a predetermined time interval, after transmitting the discovery request message.

First, in S1401, the UE 12A waits for reception of a response message (discovery response message) to the transmitted discovery request message. When determining that the discovery response message is received (YES in S1401), the UE 12A advances the processing to S1402, to acquire information in the discovery response message. The processing in S1403 to S1407 is the same as the processing in S1002 to S1006 in FIG. 10, and thus the description thereof will be omitted.

As described above, according to the present embodiment, the TDD pattern assigned to the other wireless communication apparatus belonging to the other wireless communication system is acquired from the other wireless communication apparatus by using the NR-PC5 message. Thus, the wireless network management apparatus can execute countermeasure processing, for avoiding interference, on the wireless base station under management, and interference with the other system can be avoided.

Other Embodiments

Above description is given assuming that the NR-PC5 interface is used for direct wireless communications and the NR-Uu interface is used for wireless communications with the base station, other wireless communication techniques can be employed. For example, a wireless LAN interface conforming to the IEEE 802.11 standard may be used for direct wireless communications. A wireless PAN interface conforming to the IEEE 802.15 standard may be used for wireless communications with the base station.

While a description is given assuming that each wireless communication system 1 includes one BS 11 and UE 12 in the present embodiment, each wireless communication system 1 may include a plurality of BSes 11 and a plurality of UEs 12.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-136655, filed Aug. 24, 2021, which is hereby incorporated by reference herein in its entirety.

What is claimed is:

1. A wireless communication apparatus comprising:
at least one processor; and
at least one memory storing instructions, which when executed by the processor, cause the wireless communication apparatus to:
perform wireless communications with a first base station belonging to a first wireless communication system;
perform wireless communications between wireless communication apparatuses not via the first base station;
acquire, an operating information message including pattern information indicating a time division transmission/reception pattern between a second base station belonging to a second wireless communication system different from the first wireless communication system and a second wireless communication apparatus belonging to the second wireless communication system; and
notify the first base station of the pattern information.

2. The wireless communication apparatus according to claim 1, wherein the instructions, when executed by the processor, further cause the wireless communication apparatus to receive an instruction for updating a time division transmission/reception pattern to/from the first base station.

3. The wireless communication apparatus according to claim 1, wherein the operating information message includes information with which a start timing of a wireless frame can be identified.

4. The wireless communication apparatus according to claim 1, wherein the operating information message uses a message format for broadcast notification.

5. The wireless communication apparatus according to claim 1, wherein the operating information message uses a message format for a search response.

6. The wireless communication apparatus according to claim 1, wherein the operating information message includes a plurality of pieces of the pattern information indicating the time division transmission/reception pattern.

7. The wireless communication apparatus according to claim 1, an NR-PC5 interface for a fifth generation mobile communication system, and an NR-Uu interface for the fifth generation mobile communication system.

8. The wireless communication apparatus according to claim 1, wherein the operating information message includes at least one of position information acquired by positioning through satellite communications and time information.

9. A wireless communication apparatus comprising:
at least one processor; and
at least one memory storing instructions, which when executed by the processor, cause the wireless communication apparatus to:
perform wireless communications with a first base station belonging to a first wireless communication system;
perform wireless communications between wireless communication apparatuses, not via the first base station; and
transmit an operating information message including pattern information indicating a time division transmission/reception pattern to/from the first base station via the second wireless communication unit, to a second wireless communication apparatus belonging to a second wireless communication system different from the first wireless communication system.

10. A control method for a wireless communication apparatus, the control method comprising:
performing wireless communications with a first base station belonging to a first wireless communication system;

performing wireless communications between wireless communication apparatuses not via the first base station;

acquiring an operating information message including pattern information indicating a time division transmission/reception pattern between a second base station belonging to a second wireless communication system different from the first wireless communication system and a second wireless communication apparatus belonging to the second wireless communication system; and notifying the first base station of the pattern information acquired.

11. A non-transitory computer-readable storage medium storing instructions for causing a wireless communication apparatus to:

perform wireless communications with a first base station belonging to a first wireless communication system;

perform wireless communications between wireless communication apparatuses not via the first base station;

acquire an operating information message including pattern information indicating a time division transmission/reception pattern between a second base station belonging to a second wireless communication system different from the first wireless communication system and a second wireless communication apparatus belonging to the second wireless communication system; and notify the first base station of the pattern information acquired via the first wireless communication unit.

* * * * *

14